US010984047B2

(12) United States Patent
Yousfi et al.

(10) Patent No.: US 10,984,047 B2
(45) Date of Patent: Apr. 20, 2021

(54) GRAPH PROCESSING SYSTEM THAT CAN DEFINE A GRAPH VIEW FROM MULTIPLE RELATIONAL DATABASE TABLES

(71) Applicant: Oracle International Corporation, Redwood Shores, CA (US)

(72) Inventors: Siham Yousfi, Rabat (MA); Sungpack Hong, Palo Alto, CA (US); Alexander Weld, Mountain View, CA (US); Korbinian Schmid, San Mateo, CA (US); Hassan Chafi, San Mateo, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 16/431,294

(22) Filed: Jun. 4, 2019

(65) Prior Publication Data
US 2019/0286662 A1 Sep. 19, 2019

Related U.S. Application Data

(63) Continuation of application No. 15/096,034, filed on Apr. 11, 2016, now Pat. No. 10,339,179.

(51) Int. Cl.
*G06F 16/901* (2019.01)
*G06F 16/25* (2019.01)
(Continued)

(52) U.S. Cl.
CPC ......... *G06F 16/9024* (2019.01); *G06F 16/25* (2019.01); *G06F 16/84* (2019.01); *G06F 16/90335* (2019.01)

(58) Field of Classification Search
None
See application file for complete search history.

(56) References Cited

U.S. PATENT DOCUMENTS 5,983,215 A 11/1999 Ross et al.
6,006,233 A * 12/1999 Schultz ............... G06F 16/2246
(Continued)

FOREIGN PATENT DOCUMENTS

WO WO1999045479 A1 9/1999

OTHER PUBLICATIONS

Jeffrey Heer et al, "Software Design Patterns for Information Visualization", IEEE Transactions on Visualization and Computer Graphics, vol. 12, No. 5 Sep./Oct. 2006, 8 pages.*
(Continued)

*Primary Examiner* — Uyen T Le
(74) *Attorney, Agent, or Firm* — Hickman Becker Bingham Ledesma LLP

(57) ABSTRACT

Techniques are provided for mapping tables and columns of a legacy relational schema into synthetic tables that are dedicated for graph analysis. In an embodiment, a computer receives a mapping of relational tables to node tables and edge tables. The node tables contain columns and rows. The edge tables contain columns and rows. The rows of the node tables and the rows of the edge tables define a graph. Based on the mapping and the relational tables, the computer calculates a value of at least one column of at least one row of the node tables. Based on an execution of a query of the graph, the computer returns the value.

20 Claims, 10 Drawing Sheets

(51) Int. Cl.
*G06F 16/84* (2019.01)
*G06F 16/903* (2019.01)

(56) References Cited

U.S. PATENT DOCUMENTS

| | | | |
|---|---|---|---|
| 7,580,947 B2* | 8/2009 | Kasravi | G06N 5/022 |
| 7,624,081 B2 | 11/2009 | Zhao et al. | |
| 7,849,106 B1 | 12/2010 | Agrawal | |
| 8,996,492 B2* | 3/2015 | Paradies | G06F 16/24566 |
| | | | 707/705 |
| 9,195,941 B2 | 11/2015 | Mojsilovic et al. | |
| 10,019,536 B2* | 7/2018 | Hong | G06F 16/2246 |
| 10,346,138 B1* | 7/2019 | Quillen | G06F 16/9024 |
| 2002/0184225 A1 | 12/2002 | Ghukasyan | |
| 2003/0195885 A1 | 10/2003 | Emmick | |
| 2005/0160432 A1 | 7/2005 | Gallagher | |
| 2009/0006450 A1* | 1/2009 | Champion | G06F 9/4493 |
| 2011/0307685 A1 | 12/2011 | Song | |
| 2013/0212131 A1 | 8/2013 | Reddy | |
| 2013/0332387 A1 | 12/2013 | Mirra et al. | |
| 2015/0026158 A1 | 1/2015 | Jin | |
| 2015/0081741 A1 | 3/2015 | Xu | |
| 2015/0120775 A1 | 4/2015 | Shao et al. | |
| 2015/0143179 A1* | 5/2015 | Desai | G06F 11/3688 |
| | | | 714/38.1 |
| 2015/0169757 A1* | 6/2015 | Kalantzis | G06F 16/213 |
| | | | 707/722 |
| 2015/0310644 A1 | 10/2015 | Zhou et al. | |
| 2015/0379054 A1 | 12/2015 | Kernert | |
| 2016/0071233 A1 | 3/2016 | Macko et al. | |
| 2016/0078344 A1 | 3/2016 | Agarwal et al. | |
| 2016/0140152 A1 | 5/2016 | Sevenich et al. | |
| 2016/0171068 A1 | 6/2016 | Hardin | |
| 2016/0179887 A1 | 6/2016 | Lisonbee et al. | |
| 2016/0299991 A1 | 10/2016 | Hong et al. | |
| 2017/0293697 A1 | 10/2017 | Youshi et al. | |

OTHER PUBLICATIONS

Yousfi, U.S. Appl. No. 15/096,034, filed Apr. 11, 2016, Office Action, dated Apr. 10, 2018.
Yousfi, U.S. Appl. No. 15/096,034, filed Apr. 11, 2016, Notice of Allowance, dated Feb. 14, 2019.
Yousfi, U.S. Appl. No. 15/096,034, filed Apr. 11, 2016, Interview Summary, dated Nov. 23, 2018.
Yousfi, U.S. Appl. No. 15/096,034, filed Apr. 11, 2016, Final Office Action, dated Sep. 20, 2018.
Yousfi, U.S. Appl. No. 15/096,034, filed Apr. 11, 2016, Advisory Action, dated Dec. 5, 2018.
Yonathan Perez et al., Ringo: Interactive Graph Analytics on Big-Memory Machines:, Proc ACM SIGMOD Int Conference Manag Data. Dated May-Jun. 2015, 21 pages.
Xirogiannopoulos et al., "GraphGen: Exploring Interesting Graphs in Relational Data", Proceedings of the VLDB Endowment, vol. 8, No. 12 Copyright 2015 VLDB Endowment, 4 pages.
Xirogiannopoulos et al., "Extracting and Analyzing Hidden Graphs from Relational Databases", ACM, SIGMOD dated 2017, 18 pages.
SQL Server Blog, "Graph Data Processing with SQL Server 2017 and Azure SQL Database", dated Aug. 20, 2017, 8 pages.
Oracle, "Using Property Graphs in an Oracle Database Environment", docs.oracle.com/database/122/SPGDG/using-property-graphs-oracle database.htm#BDSPA191, Apr. 23, 2018, 152 pages.
Kaur, Sawinder, "Visualizing Class Diagram Using OrientDB NoSQL Data-Store", dated Jul. 2016, 5 pages.
De Virgilio et al., "Converting Relational to Graph Databases", Proceedings of the First International Workshop on Graph Data Management Experience and Systems (GRADES 2013), Jun. 23, 2013, 6 pages.
Wikipedia, the free encyclopedia, "Subgraph isomorphism problem", https://en.wikipedia.org/wiki/Subgraph_isomorphism_problem, last viewed on Jan. 29, 2021, 4 pages.
Wikipedia, the free encyclopedia, "PageRank", https://en.wikipedia.org/wiki/PageRank, last viewed on Jan. 29, 2021, 16 pages.
Wikipedia, the free encyclopedia, "Isolation (database systems)", https://en.wikipedia.org/wiki/Isolation_(database_systems), last viewed on Jan. 29, 2021, 8 pages.
Wikipedia, the free encyclopedia, "Fetch-and-add", https://en.wikipedia.org/wiki/Fetch-and-add, last viewed on Janaury 29, 2021, 4 pages.
Wikipedia, the free encyclopedia, "Bellman-Ford algorithm", https://en.wikipedia.org/wiki/Bellman%E2%80%93Ford_algorithm, last viewed on Jan. 29, 2021, 6 pages.
Segalini et al., "Patent: efficient identification of vertices and edges for graph indexes in an RDBMS", dated Nov. 2015, 12 pages.
SAP.dom, "SAP HANA Graph Reference", SAP HANA Platform 2.0 SPS 03 Document Version: 1.1 dated Oct. 31, 2018, 84 pages.
SAP.com, "SAP HANA", Harness the power of an in-memory database with SAP HANA, SAP Business Technology Platform, https://www.sap.com/products/hana.html, last viewed on Janaury 29, 2021, 19 pages.
Microsoft.com, "SQL Sever 2019"https://www.microsoft.com/en-us/sql-server/sql-server-2019, last viewed on Jan. 29, 2021, 8 pages.
Microsoft Docs, "Graph processing with SQL Server and Azure SQL Database",docs.microsoft.com/en-us/sql/relational databases/graphs/sql-graph-overview?view=sql-server-ver15, dated Jun. 26, 2019, 5 pgs.
Hong et al., "PGX.D: A Fast Distributed Graph Processing Engine", SC '15, dated Nov. 15-20, 2015, Austin, TX, USA, 12 pages.
Hassan et al., "Extending In-Memory Relational Database Engines with Native Graph Support", Proceedings of the 21st International Conference on Extending Database Technology, dated Mar. 2018, 12 pgs. Graph Query Language GQL, "GQL Standard", https://www.gqlstandards.org/home, last viewed on Jan. 29, 2021, 2 pages.

* cited by examiner

GRAPH PROCESSING SYSTEM THAT CAN DEFINE A GRAPH VIEW FROM MULTIPLE RELATIONAL DATABASE TABLES

PRIORITY CLAIM; RELATED APPLICATION

This application claims the benefit as a continuation of U.S. patent application Ser. No. 15/096,034, filed Apr. 11, 2016, the entire contents of which is hereby incorporated by reference as if fully set forth herein, under 35 U.S.C. § 120. The applicant(s) hereby rescind any disclaimer of claim scope in the parent application(s) or the prosecution history thereof and advise the USPTO that the claims in this application may be broader than any claim in the parent application.

FIELD OF THE DISCLOSURE

This disclosure relates to graph analysis using relational databases. Techniques are presented for processing a machine-readable description that maps tables and columns of a legacy relational schema into synthetic tables that are dedicated for graph analysis.

BACKGROUND

Graph analysis is a recent methodology for data analysis that represents a data set as a graph so that fine-grained relationships between data entities are captured as edges between nodes that represent records or objects. Graph analysis provides many benefits. It enables consideration of relationships between data entities in natural ways. This is especially useful for analysis of indirect, multi-hop relationships such as graph traversal paths.

By running graph analysis algorithms on top of a graph representation, valuable non-obvious insights into the data set may emerge. Suitable graph-analysis frameworks and systems deliver this information faster than can be achieved by analyzing the data directly in its relational form and according to traditional database tools such as structured query language (SQL). Other data analysis methodologies, such as certain kernels in machine learning or statistical analysis, can be formulated as graph problems.

In typical enterprise systems, however, most data sets are already maintained in relational database systems. This is not accidental. Relational (or tabular) representation of data provides many proven benefits in terms of performance and convenience for maintaining and querying business-critical data. Therefore, there exists a gap between how data is stored and maintained relationally and how the data needs to be analyzed as a graph.

Industry is solving this issue with either of the following two approaches. The first approach creates a database system that directly manages data as a graph model, such as with a graph database. Neo4J is a popular implementation of a graph database. However, graph databases do not perform well with analytic workloads or many clients. This is partially because graph databases need to provide the same data maintenance features as have long ago been optimized for relational database. For example, graph databases do not perform as well for transactional workloads as relational databases perform.

The second approach uses a framework that is specialized for graph analysis. GraphX and GraphLab are examples of such frameworks. However, users must manually provide a graph representation of the data to these systems. Consequently with either approach, it takes much time and effort to configure a graph representation of a data set, which makes it harder and more error prone to apply graph analysis on a data set.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein according to the following outline:

1.0 General Overview
  2.0 Example Computer
    2.1 Relational Database
    2.2 Machine-Readable Mapping
    2.3 Graph Query
    2.4 Database View
  3.0 Example Mapping Process
  4.0 Associative Table
  5.0 Implied Edge
    5.1 Specification Table
  6.0 Foreign Key
  7.0 Table Join
  8.0 Universal Node Table
  9.0 Stacked Views
  10.0 Property Table 11.0 Graphical User Interface
12.0 Hardware Overview

1.0 General Overview

Techniques are provided for mapping tables and columns of a legacy relational schema into synthetic tables that are dedicated for graph analysis. In an embodiment, a computer receives a mapping of relational tables to node tables and edge tables. The node tables contain columns and rows. The edge tables contain columns and rows. The rows of the node tables and the rows of the edge tables define a graph. Based on the mapping and the relational tables, the computer calculates a value of at least one column of at least one row of the node tables. Based on an execution of a query of the graph, the computer returns the value.

In an embodiment, the mapping is a machine-readable descriptor. The mapping may be encoded as extensible markup language (XML) or JavaScript object notation (JSON).

In embodiments, various relational idioms are recognized in the relational schema and accommodated in the node and edge tables. Embodiments include other schematic refactorings, (de-)normalizations, and transformations.

In embodiments, (non-)materialized database views are defined or combined. Embodiments include a universal table of nodes or edges.

2.0 Example Computer

Figure 1:
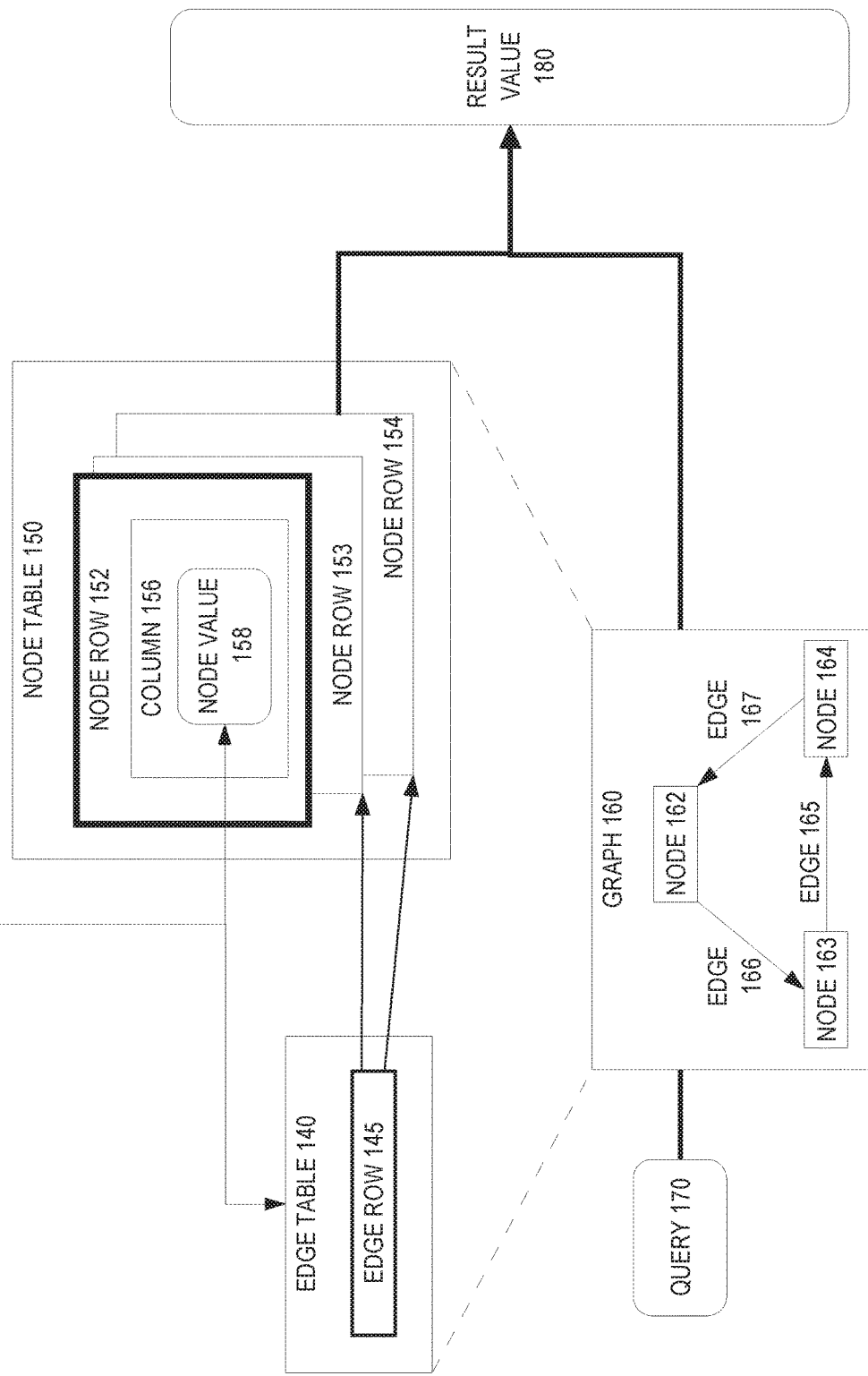
FIG. 1 is a block diagram that depicts an example computer that maps tables and columns of a legacy relational schema into synthetic tables that are dedicated for graph analysis, in an embodiment.

FIG. 1 is a block diagram that depicts an example computer 100, in an embodiment. Computer 100 processes relational tables and a formal mapping to implement a traversable graph view for path queries. Computer 100 may be a rack server such as a blade, a personal computer, a mainframe, a smartphone, a networked appliance, a virtual machine, or other computing device.

Computer 100 contains mapping 120 and tables 110, 140, and 150. In embodiments, any of mapping 120 and tables 110, 140, and 150 may span multiple computers. Embodiments may use general techniques of replication and horizontal scaling. Embodiments may use database techniques such as sharding (table partitioning).

2.1 Relational Database

Although not shown, computer 100 contains at least one relational database. The relational database may be part of a relational database management system (RDBMS), an online transactional processing (OLTP) system, an online analytical processing (OLAP) system, a data warehouse, a legacy database, or other database deployment.

Within the relational database are relational schemas with relational tables, such as 110. A relational schema may use foreign keys and associative tables to implement relations between tables.

The relational schema may have an arbitrary amount of tables, columns within tables, and relations. Data modeling encourages liberal use of these details, which may result in a rich schema with diverse tables and arbitrary relations.

Schema refactoring, such as de-normalization for optimization or legacy, may further complicate a schema. In most cases, an existing relational schema is unsuited for direct use as a graph, such as for path traversal.

2.2 Machine-Readable Mapping

Mapping 120 bridges any mismatch between a relational schema and a graph representation that has nodes and edges. Computer 100 may implement a database view that uses mapping 120 to transform the content of relational tables, such as 110, into nodes and edges of a graph.

Mapping 120 is a formal mapping that is amenable to automatic interpretation. For example, computer 100 may parse, analyze, render, or apply mapping 120.

Mapping 120 may be serialized in a machine readable format. For example, mapping 120 may be a declarative descriptor that is encoded as extensible markup language (XML) or JavaScript object notation (JSON).

When computer 100 applies mapping 120, the data of relational tables, such as 110, is eagerly or lazily transformed into a graph that can be stored within or represented by node tables, such as 150, and edge tables, such as 140. Each node table may represent a separate kind of object that populates the graph as a vertex.

For example, node table 150 may represent cats, and another node table may represent dogs. Node table 150 may store tabular data that is arranged as node rows, such as 152-154.

Each row of a node table represents one graph node. For example, node row 152 may have data that represents a particular cat.

Each node table is logically arranged as a set of rows and a set of columns. Each column has a data type, which may be a primitive type, such as a number or a string, or a complex type that aggregates smaller types.

A column may logically or actually be a vector of values of the same data type as the column. Each value resides within one column and within one row.

This coincidence of a row with a column is shown as column 156, although column 156 actually spans all node rows of node table 150. Whereas, node value 158 is data of particular node row 152.

Other node rows of node table 150 may have other node values. For example if column 156 has creation timestamps, then node value 158 may record one time, while the node value of column 156 for node row 153 may have a different time.

Nodes of a graph are interconnected with each other by edges. Edges are represented by edge tables, such as 140.

Each edge table may represent a separate kind of link that associates two vertices of the graph. For example, edge table 140 may represent cohabitation of pets. Edge table 140 may store tabular data that is arranged as edge rows, such as 145.

Each row of an edge table represents one graph edge. For example, edge row 145 may have data that represents two cats living together. This one edge is recorded and shown as edge row 145 being associated with both of node rows 153-154.

There is a technical separation of edges from rows, because they do not occupy a same graph table. However, edges and rows are logically comingled within the graph, because edges connect nodes.

This logical arrangement is shown as graph 160. Graph 160 is composed of nodes, such as 162-164, and edges such as 165-167.

Each edge of graph 160 corresponds to an edge row of edge table 140. Each node of graph 160 corresponds to a node row of node table 150.

2.3 Graph Query

In operation, computer 100 may generate or receive query 170, which specifies search criteria to be matched against the contents of graph 160. Query 170 may request one or many matching nodes or edges or may request one or many matching traversal paths of graph 160.

Query 170 may be a graph query or a path query. Query 170 may specify pattern matching according to a regular expression, such as a conjunctive regular path query or a context-free path query. Query 170 may be an RDF query such as a SPARQL query.

Query 170 may be an XPath query. Query 170 may be a relational query to be directly applied to graph tables 140 and 150, such as with structured query language (SQL).

In an embodiment, query 170 has access to graph tables, such as 140 and 150, but not to relational tables such as 110. In an embodiment, query 170 has read only access.

2.4 Database View

Tables 110, 140, and 150 occupy at least one relational database. In an embodiment, relational table 110 occupies a big-data analytics warehouse such as Apache Hive, and graph tables 140 and 150 occupy a performant relational database such as with a relational database management system (RDBMS).

In an embodiment, all of the tables occupy a single relational database. In an embodiment, all of the databases occupy only a single computer, 100.

In an embodiment, graph tables 140 and 150 exist within a database view that is directly or indirectly backed by the relational tables, such as 110. In an embodiment, the database view is defined as SQL.

In an embodiment, the database view is materialized. Materialization involves precomputation of a data snapshot, such that mapping 120 is eagerly applied to the relational tables to populate graph tables 140 and 150. With materialization, graph tables 140 and 150 actually store independent data, even if the data is merely copied from the relational tables.

In a materialized embodiment having tiered storage, node tables and edge tables may occupy one tier, and relational tables may occupy another tier. Available physical tiers include bulk volatile random access memory (RAM) such as dynamic RAM (DRAM), non-volatile RAM such as flash, or magnetic or optical disk.

In an embodiment, the database view is not materialized, such that mapping 120 is lazily applied upon demand. For example, a client may request a particular node row, at which time computer 100 directly or indirectly uses mapping 120 to select a subset of the relational data and project the selected data through the graph tables.

3.0 Example Mapping Process

Figure 2:
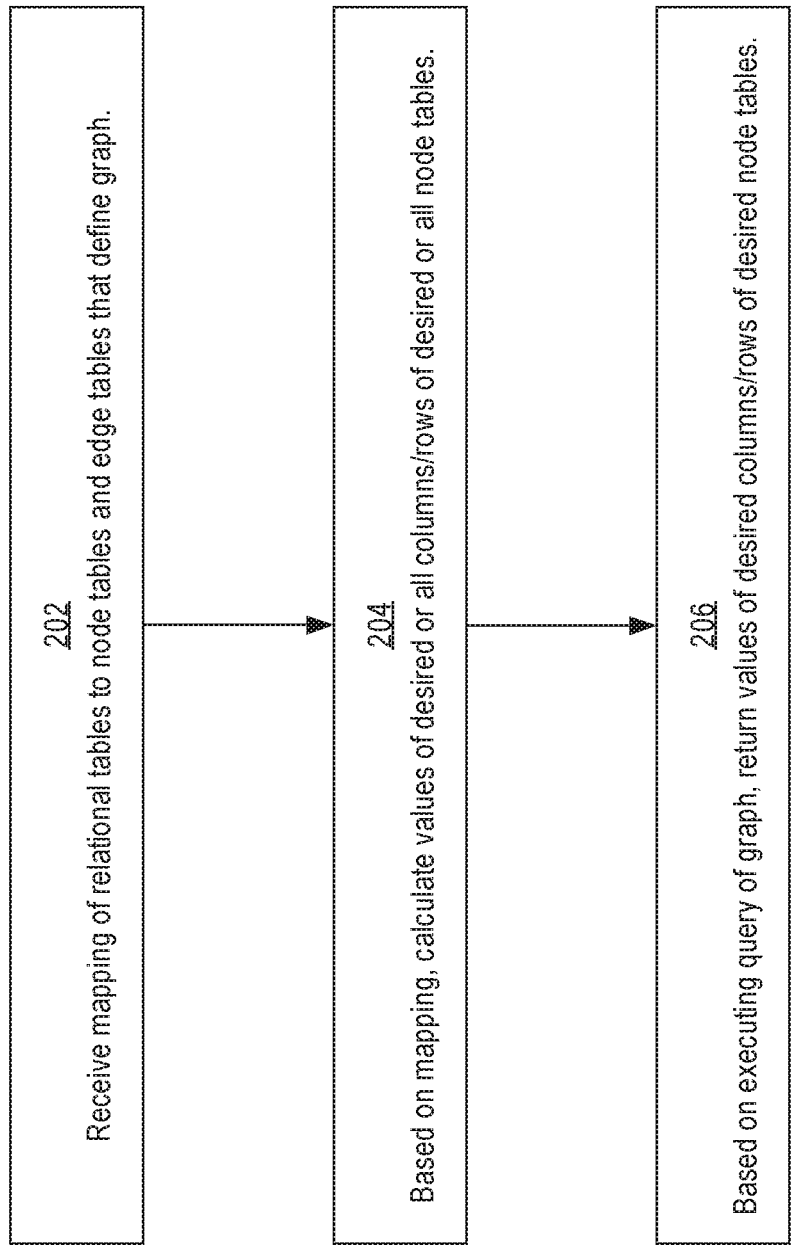
FIG. 2 is a flow diagram that depicts an example process that maps tables and columns of a legacy relational schema into synthetic tables that are dedicated for graph analysis, in an embodiment.

FIG. 2 is a flow diagram that depicts an example mapping process that prepares for and executes a graph query against a relational database, in an embodiment. This mapping process is described in the context of FIG. 1.

Step 202 is preparatory. In an embodiment, step 202 occurs only once, when no query has yet been received, such as during initialization of a computer or an application. In an embodiment, step 202 is repeated for each query.

In step 202, a mapping of relational tables to node tables and edge tables that define a graph is received. For example, computer 100 receives or generates mapping 120. For example, computer 100 fetches mapping 120 from a filesystem, a remote service, or a database.

Computer 100 may parse mapping 120 during at least any one step of FIG. 2, perhaps with a JSON or XML parser. During or after parsing, computer 100 may perform semantic analysis upon mapping 120.

In step 204 and based on the mapping, values of columns/rows of node tables are calculated. For example, computer 100 may process mapping 120 and relational table 110 to create node row 152 and calculate node value 158.

In a materialized view embodiment, materialization occurs during step 204, and query 170 is not received and executed until step 206. In a materialized view embodiment, step 206 is not performed until query 170 is received.

In a non-materialized view embodiment, query 170 is received and executed during step 204. In a non-materialized view embodiment, step 204 is not performed until query 170 is received.

During step 204 or 206, computer 100 may process mapping 120 to generate code, such as declarations and logic. For example, statements of a data definition language (DDL), data manipulation language (DML), or general-purpose programming language may be generated from mapping 120. In an embodiment, generated code includes a definition of a database view that implements the graph tables or a stored procedure that populates (perhaps after also creating) the graph tables.

In step 206 and based on an execution of a query of the graph, values of desired columns/rows of desired node tables are returned. For example, query 170 may be a graph query upon graph 160.

Query 170 may specify a subset of graph tables, columns, and rows to access or return. For example, query 170 may specify which graph tables to scan, criteria for filtering graph table rows, and which columns to project. Having calculated values in step 204, some or all of these values are returned in step 206 to a caller or client that submitted query 170.

4.0 Associative Table

Figure 3:
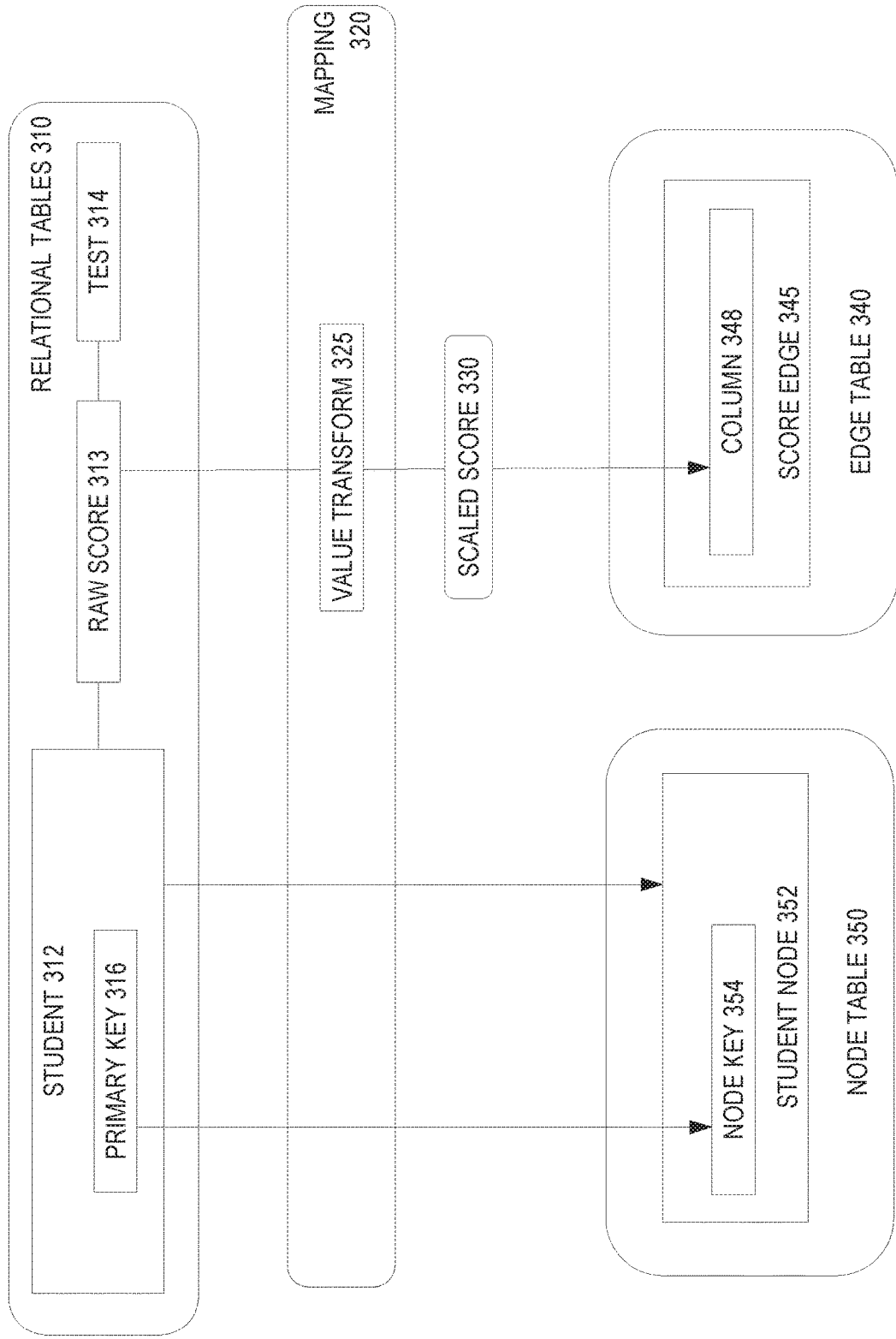
FIG. 3 is a block diagram that depicts an example computer that maps a relational table that is also an associative table to an edge table, in an embodiment.

FIG. 3 is a block diagram that depicts an example computer 300 that maps a relational table that is also an associative table to an edge table, in an embodiment. Computer 300 may be an embodiment of computer 100.

Computer 300 contains relational tables 310, mapping 320, and graph tables 340 and 350. Computer 300 may have other relational tables or graph tables.

Relational tables 310 contains tables 312-314. Student 312 is a relational table.

Each row of student 312 represents an academic student. Mapping 320 specifies that each row of student 312 is used to populate a row, such as student node 352, within node table 350.

Student 312 has primary key 316, which is a column whose values each uniquely identify a row within student 312. Node key 354 is the primary key of node table 350.

In an embodiment, mapping 320 specifies how node key 354 is automatically derived from primary key 316. In an embodiment, node key 354 is not derived from primary key 316.

Test 314 is a relational table. Each row of test 314 represents an academic test.

A student may take zero or more tests. Zero or more students may take a same test.

As such, there is a many-to-many relation between student 312 and test 314. That relation is recorded as raw score 313, which is an associative table.

Each row of raw score 313 represents an administration of a particular test to a particular student. Mapping 320 specifies that each row of raw score 313 is used to create a row, such as score edge 345, within edge table 340.

Mapping 320 may specify field (column) mappings. For example, raw score 313 may contain a column for a test score that is numeric, such as a percentage of correct answers.

Mapping 320 may map the numeric score of raw score 313 to column 348 of edge table 340. Column 348 may be an edge label. However, column 348 might not be numeric.

For example, column 348 may be a letter grade. Mapping 320 specifies value transform 325 to convert a percent score to a letter grade. Applying value transform 325 for a percentage yields scaled score 330, which is a letter grade that is suitable for use in column 348 as an edge label.

5.0 Implied Edge

Figure 4:
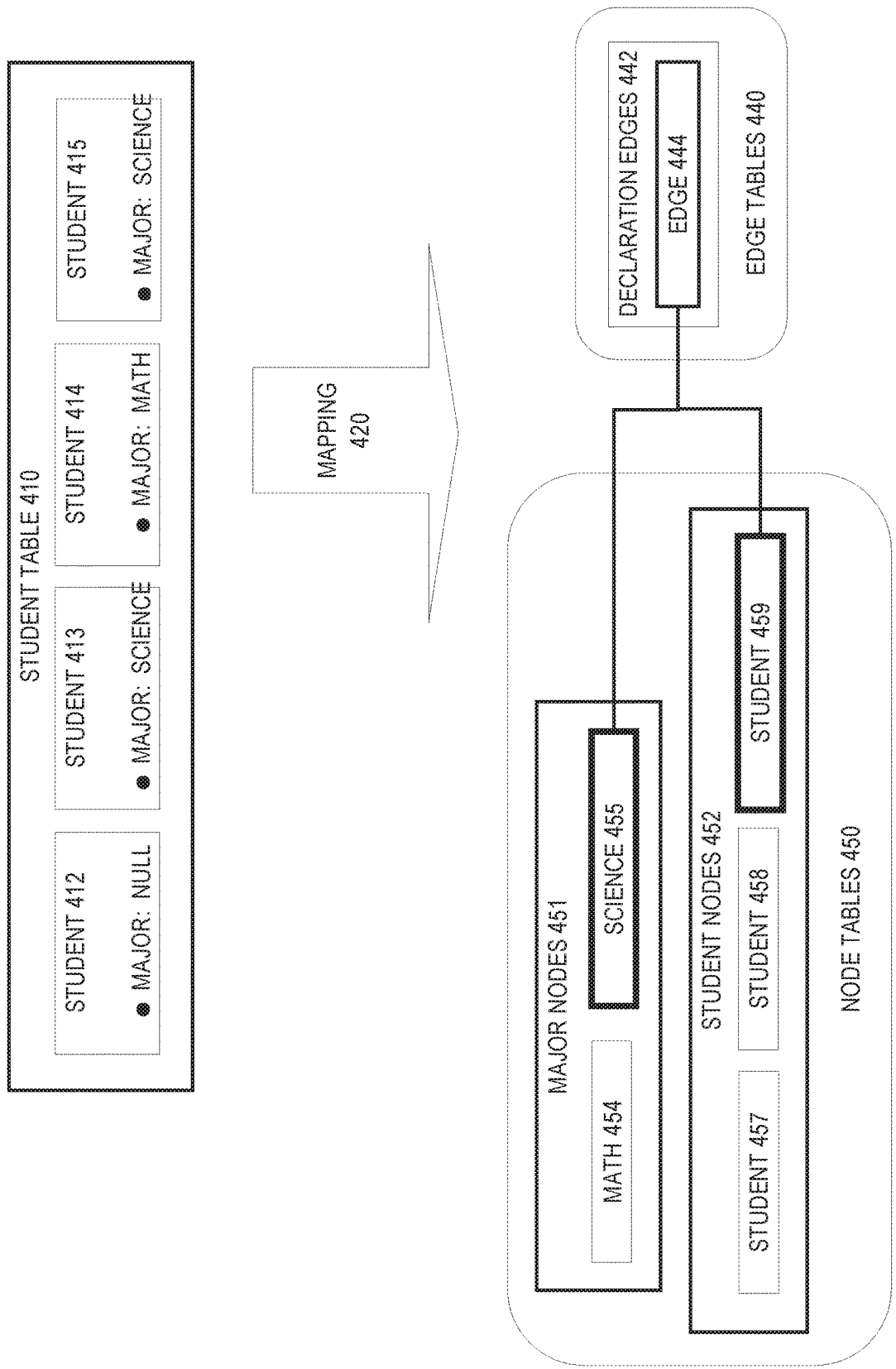
FIG. 4 is a block diagram that depicts an example computer that maps a field (column) into an edge table, in an embodiment.

FIG. 4 is a block diagram that depicts an example computer 400 that maps a field (column) into an edge table, in an embodiment. Computer 400 may be an embodiment of computer 100.

Computer 400 contains student table 410, mapping 420, edge tables 440, and node tables 450, which includes student table 410. Both of tables 440 and 450 may have more tables than shown. Likewise, student table 410 need not be the only relational table.

Student table 410 contains rows such as students 412-415. Student table 410 contains a column that indicates a chosen academic major of each student. For example, student 415 majors in science.

Student 412 has not declared a major. As such, the major of student 412 is recorded as null, which represents none.

Mapping 420 contains a machine-readable description for automatic population of graph tables, such as 442 and 451-452, from relational tables such as student table 410.

5.1 Specification Table

Major nodes 451 is a node table with academic majors as rows. This table is also a specification table, which means that duplicate rows are forbidden and rows are immutable once inserted.

Student nodes 452 is a node table with students as rows. In an embodiment, major nodes 451 is pre-populated with rows. In an embodiment, pre-populated rows are specified in mapping 420.

In an embodiment, computer 400 applies mapping 420 to each row of student table 410 to insert a row into student nodes 452. In an embodiment, computer 400 applies mapping 420 to insert a row into major nodes 451 only when a student's academic major is declared (not null).

In an embodiment, computer 400 attempts an insertion of a row into major nodes 451 only if an identical row has not already been inserted. In an embodiment, an idempotent upsert is used to populate major nodes 451.

Declaration edges 442 is an edge table and also an associative table. Every edge table is an associative table, because every edge associates two nodes or, in the case of a reflexive association, associates one node with itself.

In this example, declaration edges 442 is an associative table that implements a many-to-one association between students and majors, because a student may declare at most one major. In other examples, an edge table may implement a many-to-many (e.g. dual major) or a one-to-one association.

Computer 400 inserts a row, such as edge 444, into declaration edges 442 for each row of student table 410 that has a non-null major. In this example, edge 444 associates science 455 as the declared major of student 459.

Likewise for rows of student table 410 that have no (a null) major, no rows are inserted into declaration edges 442. For example, student 412 has a null major, and so no corresponding row in declaration edges 442 would be generated.

In an embodiment, declaration edges 442 has a foreign key to major nodes 451. In an embodiment, student nodes 452 has a foreign key to declaration edges 442. In an embodiment, declaration edges 442 has a foreign key to student nodes 452.

6.0 Foreign Key

Figure 5:
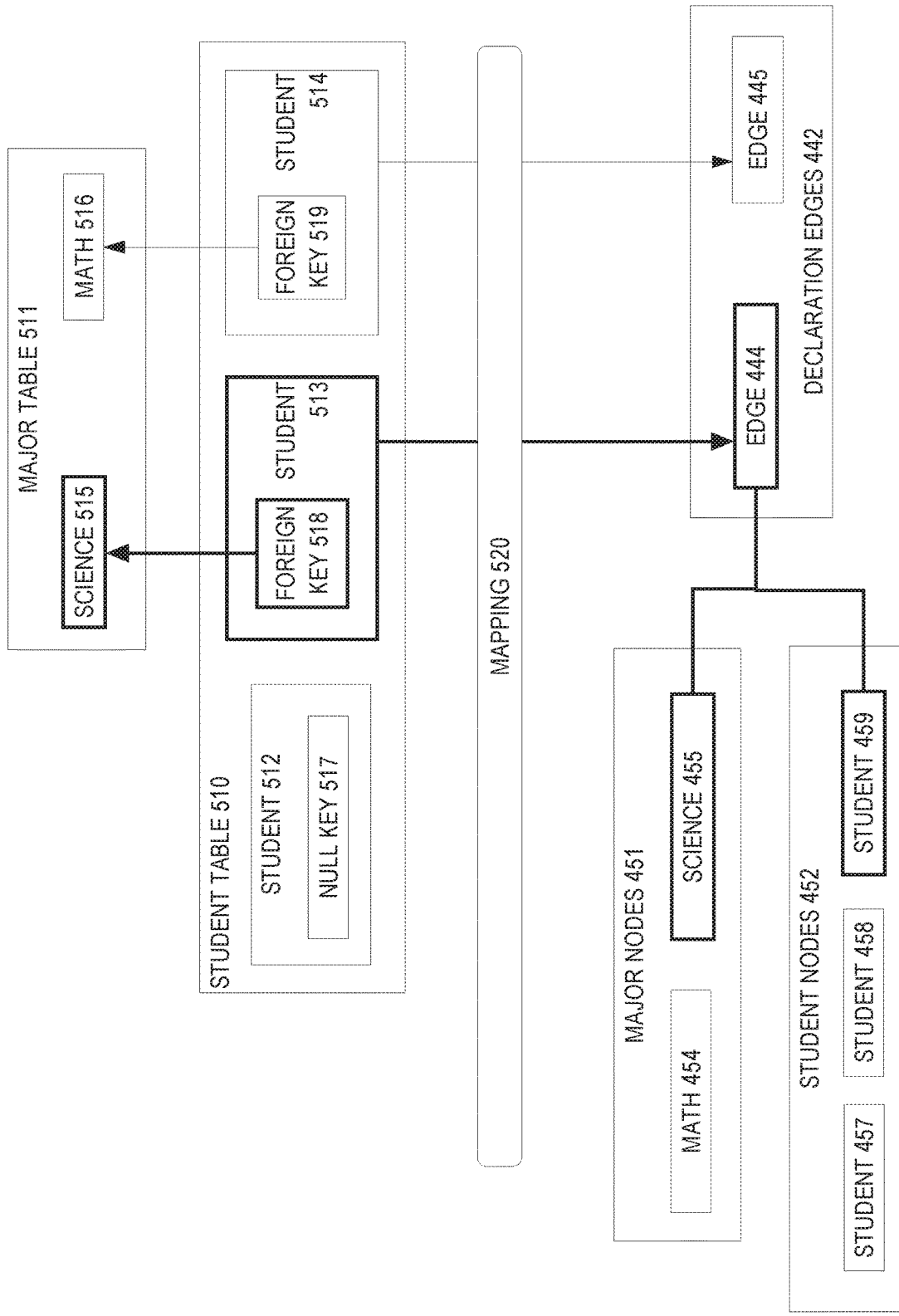
FIG. 5 is a block diagram that depicts an example computer that maps a foreign key of a relational table to an edge table, in an embodiment.

FIG. 5 is a block diagram that depicts an example computer 500 that maps a foreign key of a relational table to an edge table, in an embodiment. Computer 500 may be an embodiment of computer 100.

Computer 500 contains relational tables, such as 510-511, mapping 520, and graph tables 442 and 451-452. The graph tables of FIGS. 4-5 may be identical and are numbered identically.

The relational tables of FIGS. 4-5 model identical concepts. However, the relational schemas of FIGS. 4-5 differ.

In FIG. 5, the academic majors are modeled as major table 511 that is a specification table. A student, such as 513, has declared science 515 as an academic major, as recorded by foreign key 518.

Computer 500 processes mapping 520 to populate graph tables 442 and 451-452. A row is inserted into student nodes 452 for each row of student table 510.

If the foreign key of a row of student table 510 is not null, then an edge row, such as 444-445, is inserted into declaration edges 442. A row is not inserted if the foreign key is null.

Although not shown, declaration edges 442 has a foreign key to major nodes 451. In memory in an embodiment, computer 500 uses an associative map to track which row of major nodes 451 corresponds to which row of major table 511.

The associative map may be consulted when assigning the foreign key for each row of declaration edges 442. For example, the associative map tracks that science 455 corresponds to science 515.

7.0 Table Join

Figure 6:
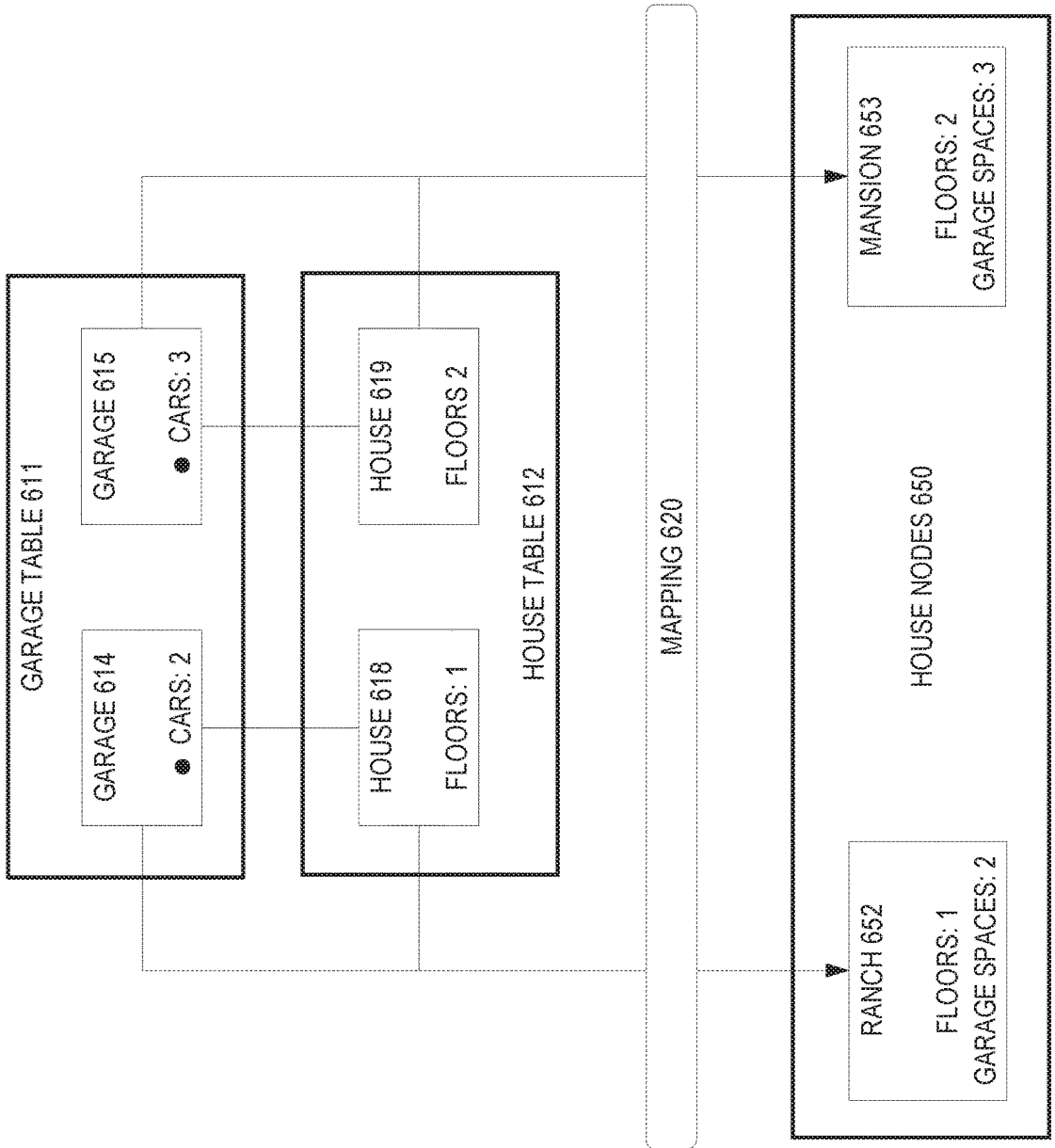
FIG. 6 is a block diagram that depicts an example computer that maps multiple relational tables into one node table, in an embodiment.

FIG. 6 is a block diagram that depicts an example computer 600 that maps multiple relational tables into one node table, in an embodiment. Computer 600 may be an embodiment of computer 100.

Computer 600 contains mapping 620, graph tables, such as 650, and relational tables such as 611-612. House table 612 records residential houses. Garage table 611 records residential garages.

Because each house has a garage, each row of house table 612 corresponds to a row of garage table 611. For example, house 618 has garage 614.

Computer 600 processes mapping 620 and the relational tables to populate graph tables, such as 650. Computer 600 may dynamically join relational tables 611-612 into logical pairs, perhaps by using a join operation such as an equijoin or a semijoin. For each pair that is processed, a row such as 652 or 653 is inserted into house nodes 650.

In this example, house nodes 650 has a floors column that is mapped from house table 612. Likewise, house nodes 650 has a garage spaces column that is mapped from garage table 611.

8.0 Universal Node Table

Figure 7:
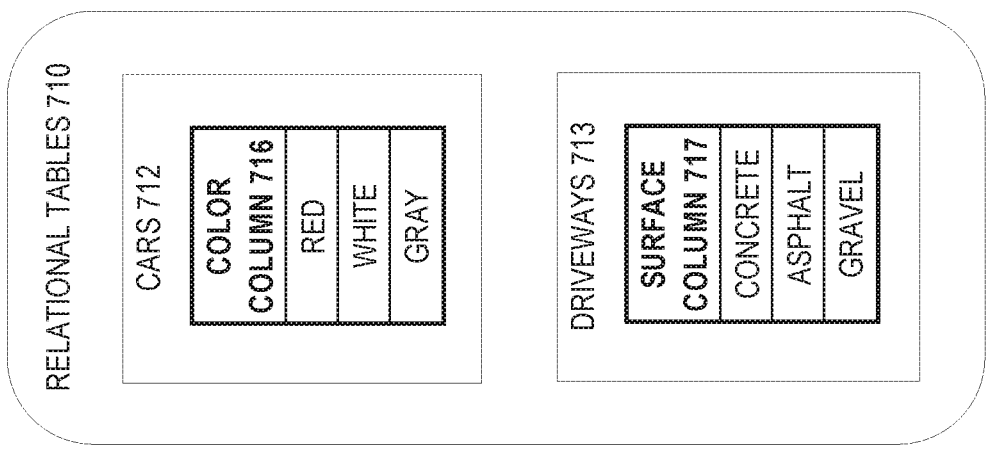
FIG. 7 is a block diagram that depicts an example computer that maps all relational tables into one universal node table, in an embodiment.

FIG. 7 is a block diagram that depicts an example computer 700 that maps all relational tables into one universal node table, in an embodiment. Computer 700 may be an embodiment of computer 100.

Computer 700 contains relational tables 710, mapping 720, and universal node table 750 as the only node table. Relational tables 710 includes tables such as 712-713.

Driveways 713 records residential driveways. Cars 712 records residentially parked cars. Each of relational tables 712-713 contains columns such as 716-717.

Universal node table 750 may be a wide table having many columns, such as 756-757. Mapping 720 may map each column of relational tables 710 to a respective column of universal node table 750. For example, universal node table 750 may have as many columns as the union of all columns in relational tables 710.

Mapping 720 may map each row of each of relational tables 712-713 to a respective row in universal node table 750. For example, universal node table 750 may have as many rows as the union of all rows in relational tables 710.

In this example, the top three rows of universal node table 750 are mapped from cars 712. Cars 712 does not have a surface column. Therefore, surface column 757 is empty (null) for the top three rows.

The bottom three rows of universal node table 750 are mapped from driveways 713. Driveways 713 does not have a color column. Therefore, color column 756 is empty for the bottom three rows.

If universal node table 750 is provided by a materialized view or is not provided by a view, then universal node table 750 may be huge (wide and tall). For example, universal node table 750 may have all of the rows and columns of relational tables 710.

Because universal node table 750 is inherently sparse (many nulls), it may be compressed to avoid excessive storage capacity demand. Compression may be necessary to fit all of universal node table 750 into memory. For example, universal node table 750 may use a compression format such as compressed sparse row (CSR) or compressed sparse column (CSC).

9.0 Stacked Views

Figure 8:
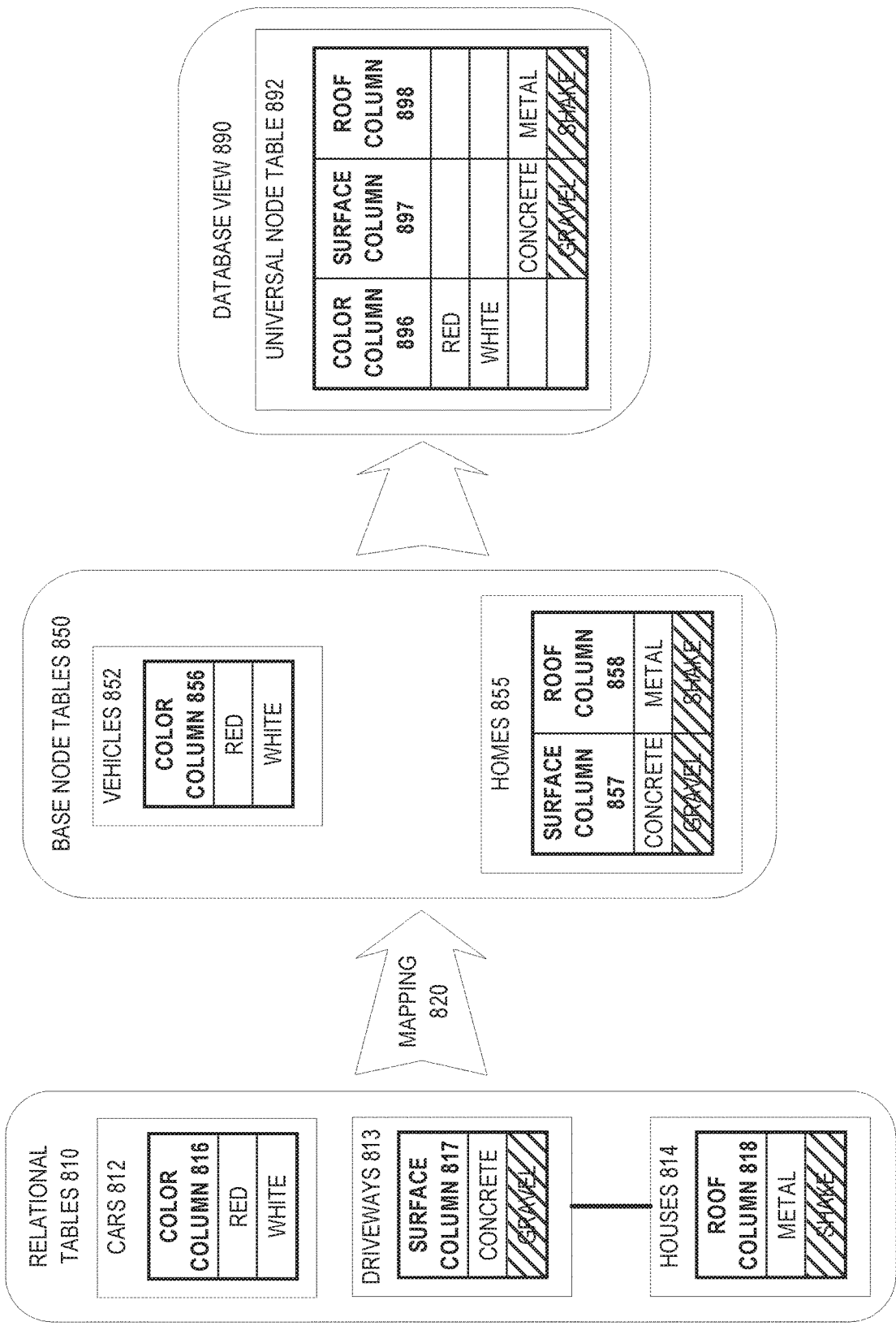
FIG. 8 is a block diagram that depicts an example computer that superimposes a database view that uses node tables as base tables, in an embodiment.

FIG. 8 is a block diagram that depicts an example computer 800 that superimposes a database view that uses node tables as base tables, in an embodiment. Computer 800 may be an embodiment of computer 100.

Computer 800 contains relational tables 810, mapping 820, base node tables 850, and database view 890. Relational tables 810 includes tables such as 812-814.

Houses 814 records residential houses and includes columns such as 818. Relational tables 813-814 are joined by a one-to-one association because each house has a driveway.

Base node tables 850 includes tables 852 and 855. In an embodiment, relational tables 810 and base node tables 850 reside in non-volatile storage such as a mechanical disk.

In an embodiment, base node tables 850 are provided by a materialized view. In an embodiment, base node tables 850 are not provided by a view.

Base node tables 850 are populated based on mapping 820 and relational tables 810. Relational tables 813-814 are joined into pairs that are mapped (along with their columns) to home 855.

The database of computer 800 has three logical tiers which are: (1) relational tables 810, (2) graph tables including base node tables 850 and edge tables, and (3) database view 890. As shown, the shaded fields depict the representation of the same data across the three tiers.

Universal node table 892 may be the only node table that is provided by database view 890. Database view 890 uses base node tables 850 as base tables and perhaps as a backing store.

In an embodiment, database view 890 is not materialized. In an embodiment, database view 890 is materialized within memory.

In an embodiment, database view 890 is materialized within memory in a compressed sparse row (CSR) or compressed sparse column (CSC) format. Although universal node table 892 has volatile storage and is not durable, durability may be added by saving some or all compressed sparse rows or some or all compressed sparse columns as a large object, such as a binary large object (BLOB) or character large object (CLOB) within the database for later reuse.

Many of the techniques described above for a universal node table are readily applicable for use with a universal edge table.

10.0 Property Table

Figure 9:
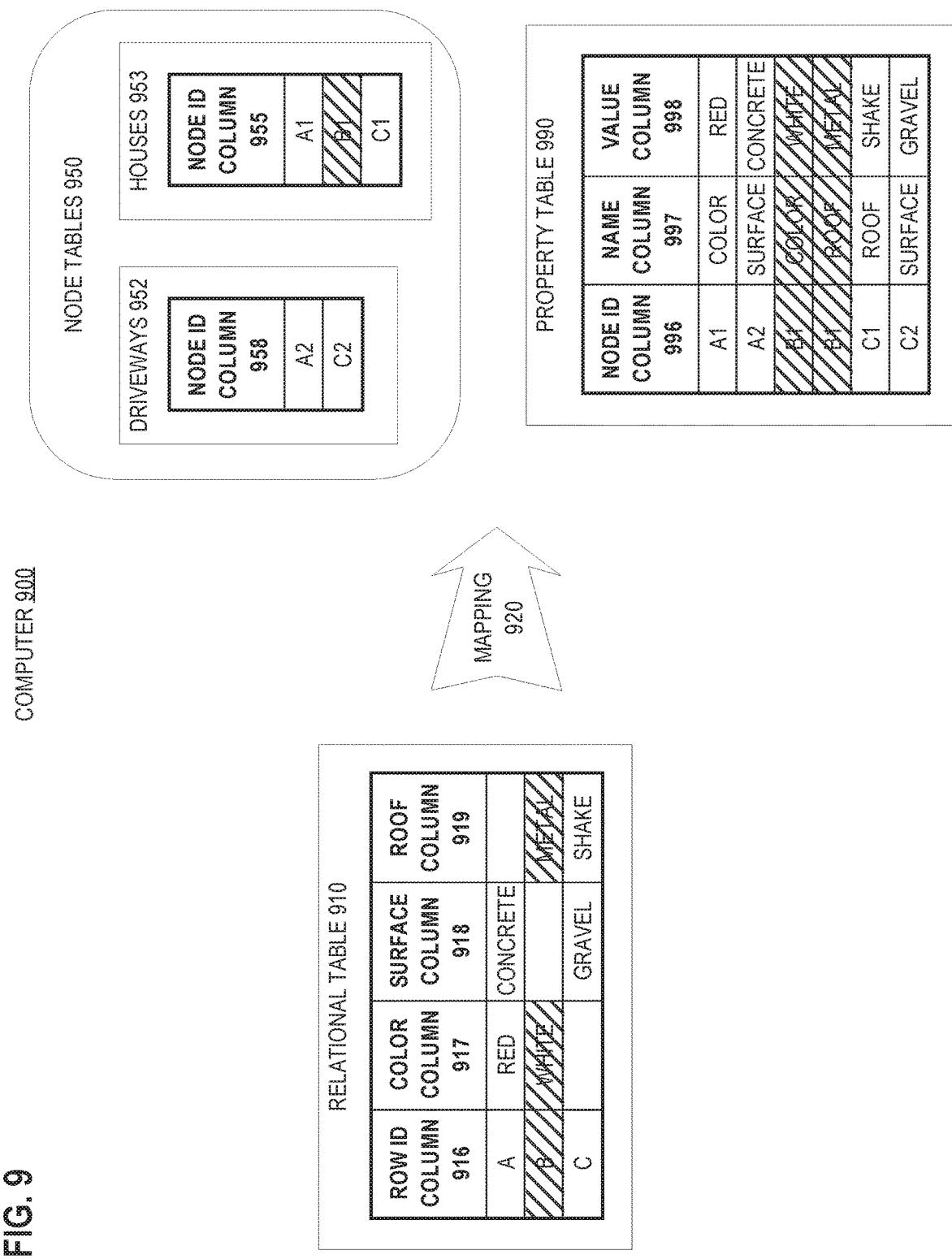
FIG. 9 is a block diagram that depicts an example computer that uses a property table to store node attributes as name/value pairs, in an embodiment.

FIG. 9 is a block diagram that depicts an example computer 900 that uses a property table to store node attributes as name/value pairs, in an embodiment. Computer 900 may be an embodiment of computer 100.

Computer 900 contains relational tables such as 910, mapping 920, node tables 950, and property table 990. Node tables 810 includes tables such as 952-953.

According to mapping 920, surface column 918 is associated with driveways 952, and columns 917 and 919 are associated with houses 953. For example, row B of relational table 910 records a home that does not have a driveway (no off-street parking). As such, driveways 952 does not contain a row that corresponds to row B of relational table 910.

However, row B of relational table 910 corresponds to node B1 of houses 953. Both of row B and node B1 specify a same house that is painted white and has a metal roof.

However, node tables 952-953 do not contain columns for such node properties. Instead, some or all properties of a node are mapped as name/value pairs to property table 990, regardless of which of node tables 952-953 contains the node.

For example, node B1 of houses 953 is painted white with a metal roof. The key "B1" may be used to lookup within node ID column 896 of property table 990 any node properties that are available for node B1.

For example, node ID column 955 of houses 953 may be a foreign key for joining on node ID column 896 of property table 990. Performing such a join and filtering for "B1" will select the two shaded rows of property table 990. The two shaded rows of property table 990 indicate that node B1 is a white house with a metal roof.

In an embodiment, property table 990 is sorted (as shown) on node ID column 996 to maximize locality of properties for a same node. In an embodiment, property table 990 is sorted on column 997 or 998 to maximize run-length encoding. In an embodiment, each column of property table 990 is stored in column-major format, perhaps with each column stored as a separate column vector.

11.0 Graphical User Interface

Any of the various computers presented herein may include a graphical user interface (GUI). For example, edge tables and graph tables together encode a graph. The graph may be visually represented in a natural way by using graph drawing. The drawn graph may support direct manipulation based on pointer gestures. Direct manipulation or viewpoint control may facilitate navigation within a large graph by supporting interactions such as pan, zoom, recentering, and collapsing or expanding a subgraph.

Another GUI may enable editing of a mapping descriptor using point-and-click interactions. Data mapping tools, such as BizTalk Mapper or an extract, transform, and load (ETL) mapping tool exhibit such interactions for mapping configuration.

12.0 Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 10:
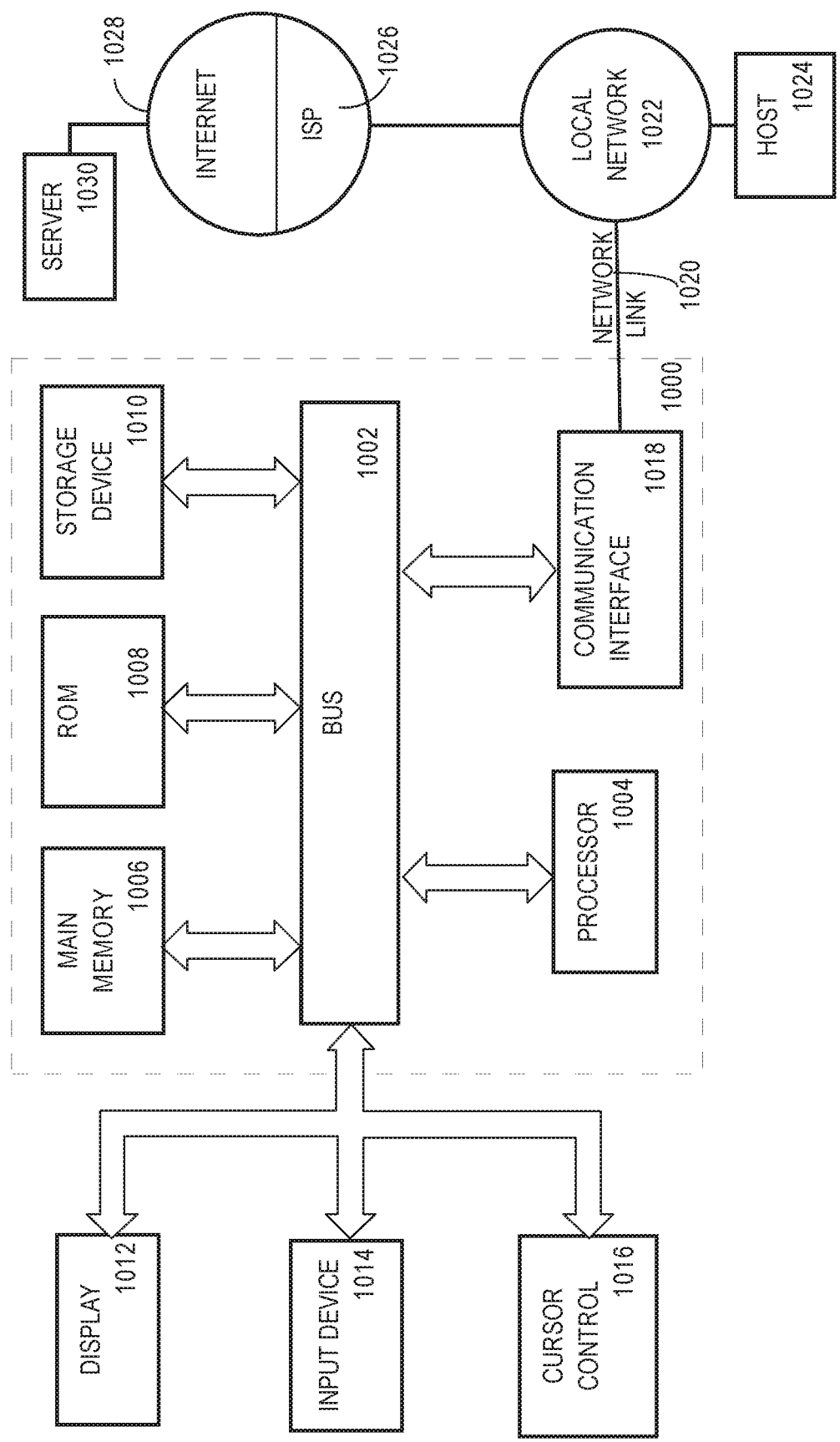
FIG. 10 is a block diagram that illustrates a computer system upon which an embodiment of the invention may be implemented.

For example, FIG. 10 is a block diagram that illustrates a computer system 1000 upon which an embodiment of the invention may be implemented. Computer system 1000 includes a bus 1002 or other communication mechanism for communicating information, and a hardware processor 1004 coupled with bus 1002 for processing information. Hardware processor 1004 may be, for example, a general purpose microprocessor.

Computer system 1000 also includes a main memory 1006, such as a random access memory (RAM) or other dynamic storage device, coupled to bus 1002 for storing information and instructions to be executed by processor 1004. Main memory 1006 also may be used for storing temporary variables or other intermediate information during execution of instructions to be executed by processor 1004. Such instructions, when stored in non-transitory storage media accessible to processor 1004, render computer system 1000 into a special-purpose machine that is customized to perform the operations specified in the instructions.

Computer system 1000 further includes a read only memory (ROM) 1008 or other static storage device coupled to bus 1002 for storing static information and instructions for processor 1004. A storage device 1010, such as a magnetic disk or optical disk, is provided and coupled to bus 1002 for storing information and instructions.

Computer system 1000 may be coupled via bus 1002 to a display 1012, such as a cathode ray tube (CRT), for displaying information to a computer user. An input device 1014, including alphanumeric and other keys, is coupled to bus 1002 for communicating information and command selections to processor 1004. Another type of user input device is cursor control 1016, such as a mouse, a trackball, or cursor direction keys for communicating direction information and command selections to processor 1004 and for controlling cursor movement on display 1012. This input device typically has two degrees of freedom in two axes, a first axis (e.g., x) and a second axis (e.g., y), that allows the device to specify positions in a plane.

Computer system 1000 may implement the techniques described herein using customized hard-wired logic, one or more ASICs or FPGAs, firmware and/or program logic which in combination with the computer system causes or programs computer system 1000 to be a special-purpose machine. According to one embodiment, the techniques herein are performed by computer system 1000 in response to processor 1004 executing one or more sequences of one or more instructions contained in main memory 1006. Such instructions may be read into main memory 1006 from another storage medium, such as storage device 1010. Execution of the sequences of instructions contained in main memory 1006 causes processor 1004 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 1010. Volatile media includes dynamic memory, such as main memory 1006. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1002. Transmission media can also take the form of acoustic or light waves, such as those generated during radio-wave and infra-red data communications.

Various forms of media may be involved in carrying one or more sequences of one or more instructions to processor 1004 for execution. For example, the instructions may initially be carried on a magnetic disk or solid state drive of a remote computer. The remote computer can load the instructions into its dynamic memory and send the instructions over a telephone line using a modem. A modem local to computer system 1000 can receive the data on the telephone line and use an infra-red transmitter to convert the data to an infra-red signal. An infra-red detector can receive the data carried in the infra-red signal and appropriate circuitry can place the data on bus 1002. Bus 1002 carries the data to main memory 1006, from which processor 1004 retrieves and executes the instructions. The instructions received by main memory 1006 may optionally be stored on storage device 1010 either before or after execution by processor 1004.

Computer system 1000 also includes a communication interface 1018 coupled to bus 1002. Communication interface 1018 provides a two-way data communication coupling to a network link 1020 that is connected to a local network 1022. For example, communication interface 1018 may be an integrated services digital network (ISDN) card, cable modem, satellite modem, or a modem to provide a data communication connection to a corresponding type of telephone line. As another example, communication interface 1018 may be a local area network (LAN) card to provide a data communication connection to a compatible LAN. Wireless links may also be implemented. In any such implementation, communication interface 1018 sends and receives electrical, electromagnetic or optical signals that carry digital data streams representing various types of information.

Network link 1020 typically provides data communication through one or more networks to other data devices. For example, network link 1020 may provide a connection through local network 1022 to a host computer 1024 or to data equipment operated by an Internet Service Provider (ISP) 1026. ISP 1026 in turn provides data communication services through the world wide packet data communication network now commonly referred to as the "Internet" 1028. Local network 1022 and Internet 1028 both use electrical, electromagnetic or optical signals that carry digital data streams. The signals through the various networks and the signals on network link 1020 and through communication interface 1018, which carry the digital data to and from computer system 1000, are example forms of transmission media.

Computer system 1000 can send messages and receive data, including program code, through the network(s), network link 1020 and communication interface 1018. In the Internet example, a server 1030 might transmit a requested code for an application program through Internet 1028, ISP 1026, local network 1022 and communication interface 1018.

The received code may be executed by processor 1004 as it is received, and/or stored in storage device 1010, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   creating a database view that defines:
   a) a plurality of node tables that comprises a plurality of node rows that represent a plurality of vertices of a graph, wherein the plurality of node tables contains a first node table and a second node table that represent separate respective kinds of objects, and
   b) one or more edge tables that comprise a plurality of edge rows that each has a one-to-one correspondence with a respective edge of the graph;
   generating, into memory, content of said first node table and said second node table based on said database view;
   returning a result based on: an execution of a query of said graph, and said content of said first node table and said second node table in said memory.

2. The method of claim 1 wherein said database view that defines said plurality of node tables is non-materialized.

3. The method of claim 1 wherein said one or more edge tables that comprise said plurality of edge rows comprises an associative table.

4. The method of claim 1 wherein:
   the database view is backed by one or more relational tables that comprise a first primary key;
   said plurality of node tables comprises a second primary key that is: based on the first primary key, or not based on the first primary key.

5. The method of claim 1 further comprising generating a specification table that is populated by statements consisting of: upsert statements, and/or idempotent statements.

6. The method of claim 1 wherein the database view that defines said plurality of node tables is based on a second database view.

7. The method of claim 1 wherein:
   said plurality of node tables comprises a plurality of properties that are stored as name-value pairs in a property table;
   the property table comprises a name column that stores names of said name-value pairs and a value column that stores values of said name-value pairs.

8. The method of claim 1 wherein said plurality of node tables comprises: a) node identifiers, and b) a plurality of properties that are stored as name-value pairs in a property table that is sorted by the node identifiers.

9. The method of claim 1 wherein said plurality of node tables comprises a plurality of properties that are stored as name-value pairs in a property table that comprises compression.

10. The method of claim 9 wherein:
    the property table comprises a name column and a value column;
    said compression comprises compression of the name column.

11. The method of claim 9 wherein said compression of the property table comprises run length encoding (RLE).

12. One or more non-transitory computer-readable media storing instructions that, when executed by one or more processors, cause:
    creating a database view that defines:
    a) a plurality of node tables that comprises a plurality of node rows that represent a plurality of vertices of a graph, wherein the plurality of node tables contains a first node table and a second node table that represent separate respective kinds of objects, and
    b) one or more edge tables that comprise a plurality of edge rows that each has a one-to-one correspondence with a respective edge of the graph;
    generating, into memory, content of said first node table and said second node table based on said database view;
    returning a result based on: an execution of a query of said graph, and said content of said first node table and said second node table in said memory.

13. The one or more non-transitory computer-readable media of claim 12 wherein said database view that defines said plurality of node tables is non-materialized.

14. The one or more non-transitory computer-readable media of claim 12 wherein said one or more edge tables that comprise said plurality of edge rows comprises an associative table.

15. The one or more non-transitory computer-readable media of claim 12 wherein:
    the database view is backed by one or more relational tables that comprise a first primary key;
    said plurality of node tables comprises a second primary key that is: based on the first primary key, or not based on the first primary key.

16. The one or more non-transitory computer-readable media of claim 12 wherein said instructions further cause generating
    a specification table that is populated by statements consisting of: upsert statements, and/or idempotent statements.

17. The one or more non-transitory computer-readable media of claim 12 wherein the database view that defines said plurality of node tables is based on a second database view.

18. The one or more non-transitory computer-readable media of claim 12 wherein:
    said plurality of node tables comprises a plurality of properties that are stored as name-value pairs in a property table;
    the property table comprises a name column that stores names of said name-value pairs and a value column that stores values of said name-value pairs.

19. The one or more non-transitory computer-readable media of claim 12 wherein said plurality of node tables comprises: a) node identifiers, and b) a plurality of properties that are stored as name-value pairs in a property table that is sorted by the node identifiers.

20. The one or more non-transitory computer-readable media of claim 12 wherein said plurality of node tables comprises a plurality of properties that are stored as name-value pairs in a property table that comprises compression.

* * * * *